US012593050B2

(12) United States Patent
Shah et al.

(10) Patent No.: US 12,593,050 B2
(45) **Date of Patent: \*Mar. 31, 2026**

(54) SYSTEMS AND METHODS FOR MULTIPLE BIT RATE CONTENT ENCODING

(71) Applicant: Adeia Guides Inc., San Jose, CA (US)

(72) Inventors: Akshay Chetan Shah, Mumbai (IN);
Padmassri Chandrashekar, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,022

(22) Filed: Jan. 9, 2024

(65) Prior Publication Data

US 2024/0223781 A1      Jul. 4, 2024

Related U.S. Application Data

(63) Continuation of application No. 17/176,503, filed on Feb. 16, 2021, now Pat. No. 11,909,988, which is a continuation of application No. 16/438,784, filed on Jun. 12, 2019, now Pat. No. 10,951,902.

(51) Int. Cl.

| | |
|---|---|
| *H04N 19/167* | (2014.01) |
| *H04N 19/146* | (2014.01) |
| *H04N 19/166* | (2014.01) |
| *H04N 19/172* | (2014.01) |

(52) U.S. Cl.
CPC ......... *H04N 19/167* (2014.11); *H04N 19/146* (2014.11); *H04N 19/166* (2014.11); *H04N 19/172* (2014.11)

(58) Field of Classification Search
None
See application file for complete search history.

(56) References Cited

U.S. PATENT DOCUMENTS

| | | | |
|---|---|---|---|
| 5,557,684 | A | 9/1996 | Wang et al. |
| 6,477,541 | B1 | 11/2002 | Korst et al. |
| 7,984,174 | B2 | 7/2011 | Rideout |
| 8,451,901 | B2 | 5/2013 | Lee et al. |
| 8,451,909 | B1 | 5/2013 | Johnson et al. |
| 8,542,874 | B2 | 9/2013 | Hoeflinger |
| 8,970,654 | B1 | 3/2015 | Johnson et al. |
| 9,100,509 | B1 * | 8/2015 | Jia .............................. H04N 7/00 |

(Continued)

OTHER PUBLICATIONS

Chen et al., "Dynamic Bit Allocation for Multiple Video Object Coding," IEEE Transactions on Multimedia, 8 (6):1117-1124 (2006).

(Continued)

*Primary Examiner* — Mohammad J Rahman
(74) *Attorney, Agent, or Firm* — HG LAW LLP

(57)      ABSTRACT

Systems and methods for encoding a video stream at multiple bit rates is disclosed herein. An encoder divides each frame of a video stream into a plurality of portions and allocates an available number of bits between the plurality of portions based on user preference information. Portions having one or more objects of interest to the viewer determined based on the user preference information are allocated a higher number of available bits while portions of the frames that do not include one or more objects of interest are allocated a minimum number of bits from the available bits.

20 Claims, 9 Drawing Sheets

(56) References Cited

U.S. PATENT DOCUMENTS

| | | | |
|---|---|---|---|
| 9,319,702 B2 | 4/2016 | Dzik | |
| 9,749,638 B1 | 8/2017 | Jia | |
| 10,063,927 B1 | 8/2018 | Singh et al. | |
| 10,255,295 B2* | 4/2019 | Gunningham | G06F 16/5838 |
| 10,264,211 B2 | 4/2019 | Leech et al. | |
| 10,375,443 B2 | 8/2019 | Patel et al. | |
| 10,412,318 B1 | 9/2019 | Ong et al. | |
| 10,482,925 B1 | 11/2019 | Tyagi et al. | |
| 10,506,237 B1 | 12/2019 | Liu et al. | |
| 10,528,186 B2 | 1/2020 | Siddiq et al. | |
| 10,691,744 B2* | 6/2020 | Dorner | G06F 16/54 |
| 10,951,902 B2 | 3/2021 | Shah et al. | |
| 10,992,940 B2* | 4/2021 | Syed | H04N 19/154 |
| 11,483,580 B2* | 10/2022 | Bruns | H04N 19/19 |
| 11,909,988 B2 | 2/2024 | Shah et al. | |
| 2003/0043741 A1 | 3/2003 | Mukai et al. | |
| 2003/0076334 A1 | 4/2003 | Dumitras et al. | |
| 2004/0008767 A1 | 1/2004 | Ueda et al. | |
| 2004/0208120 A1 | 10/2004 | Shenoi | |
| 2005/0195899 A1 | 9/2005 | Han | |
| 2006/0045381 A1 | 3/2006 | Matsuo et al. | |
| 2007/0124157 A1 | 5/2007 | Laumeyer et al. | |
| 2008/0029708 A1 | 2/2008 | Olsen et al. | |
| 2008/0051660 A1 | 2/2008 | Kakadaris et al. | |
| 2008/0159135 A1 | 7/2008 | Caram | |
| 2008/0293494 A1* | 11/2008 | Adiraju | G07F 17/3223 |
| | | | 463/43 |
| 2009/0295993 A1* | 12/2009 | Chhokra | H04N 5/782 |
| | | | 348/E5.096 |
| 2010/0278386 A1 | 11/2010 | Hoeflinger | |
| 2011/0102568 A1 | 5/2011 | Bonnet | |
| 2012/0170642 A1 | 7/2012 | Braness et al. | |
| 2013/0051768 A1 | 2/2013 | Soroushian et al. | |
| 2013/0107707 A1 | 5/2013 | Ramamurthy et al. | |
| 2013/0259114 A1 | 10/2013 | Carlsson et al. | |
| 2014/0173055 A1 | 6/2014 | Yu | |
| 2014/0211842 A1 | 7/2014 | Zhao et al. | |
| 2014/0320740 A1 | 10/2014 | Wan et al. | |
| 2015/0036051 A1 | 2/2015 | Broberg et al. | |
| 2015/0081770 A1 | 3/2015 | Matsui et al. | |
| 2015/0256749 A1 | 9/2015 | Frey et al. | |
| 2015/0312572 A1 | 10/2015 | Owen | |
| 2016/0329078 A1 | 11/2016 | Park et al. | |
| 2017/0013206 A1* | 1/2017 | Fujimori | H04N 23/957 |
| 2017/0034578 A1 | 2/2017 | Patel et al. | |
| 2017/0041548 A1 | 2/2017 | Robinson et al. | |
| 2017/0134738 A1 | 5/2017 | Neuman | |
| 2017/0164029 A1 | 6/2017 | Dey et al. | |
| 2018/0007366 A1* | 1/2018 | Wang | H04N 19/159 |
| 2018/0077380 A1 | 3/2018 | Tran | |
| 2018/0084279 A1 | 3/2018 | Thiagarajan et al. | |
| 2018/0113577 A1 | 4/2018 | Burns et al. | |
| 2018/0288420 A1* | 10/2018 | Yu | H04N 19/172 |
| 2018/0309991 A1 | 10/2018 | Thiagarajan et al. | |
| 2018/0374276 A1 | 12/2018 | Powers et al. | |
| 2019/0028710 A1 | 1/2019 | Fu et al. | |
| 2019/0037222 A1 | 1/2019 | Gu et al. | |
| 2019/0116371 A1* | 4/2019 | Edpalm | H04N 19/167 |
| 2019/0116382 A1* | 4/2019 | Edpalm | H04N 19/61 |
| 2019/0228253 A1* | 7/2019 | Ramaswamy | H04N 21/8456 |
| 2019/0268605 A1* | 8/2019 | Yamasaki | H04N 19/124 |
| 2019/0282133 A1 | 9/2019 | Bonnet | |
| 2020/0020310 A1 | 1/2020 | Kumar et al. | |
| 2020/0396464 A1 | 12/2020 | Shah et al. | |
| 2021/0176467 A1 | 6/2021 | Saeedi et al. | |
| 2021/0195211 A1 | 6/2021 | Shah et al. | |
| 2021/0275893 A1 | 9/2021 | Mcwilliams et al. | |
| 2022/0107966 A1 | 4/2022 | Santos-Alejandro | |
| 2022/0159339 A1 | 5/2022 | Hisanaga et al. | |
| 2022/0198684 A1 | 6/2022 | Fang et al. | |

OTHER PUBLICATIONS

Tancharoen et a., "Automatic face color segmentation based rate control for low bit-rate video coding," IEEE International Symposium on Circuits and Systems, p. II384-II387 (ISCAS) (2003).

* cited by examiner

200

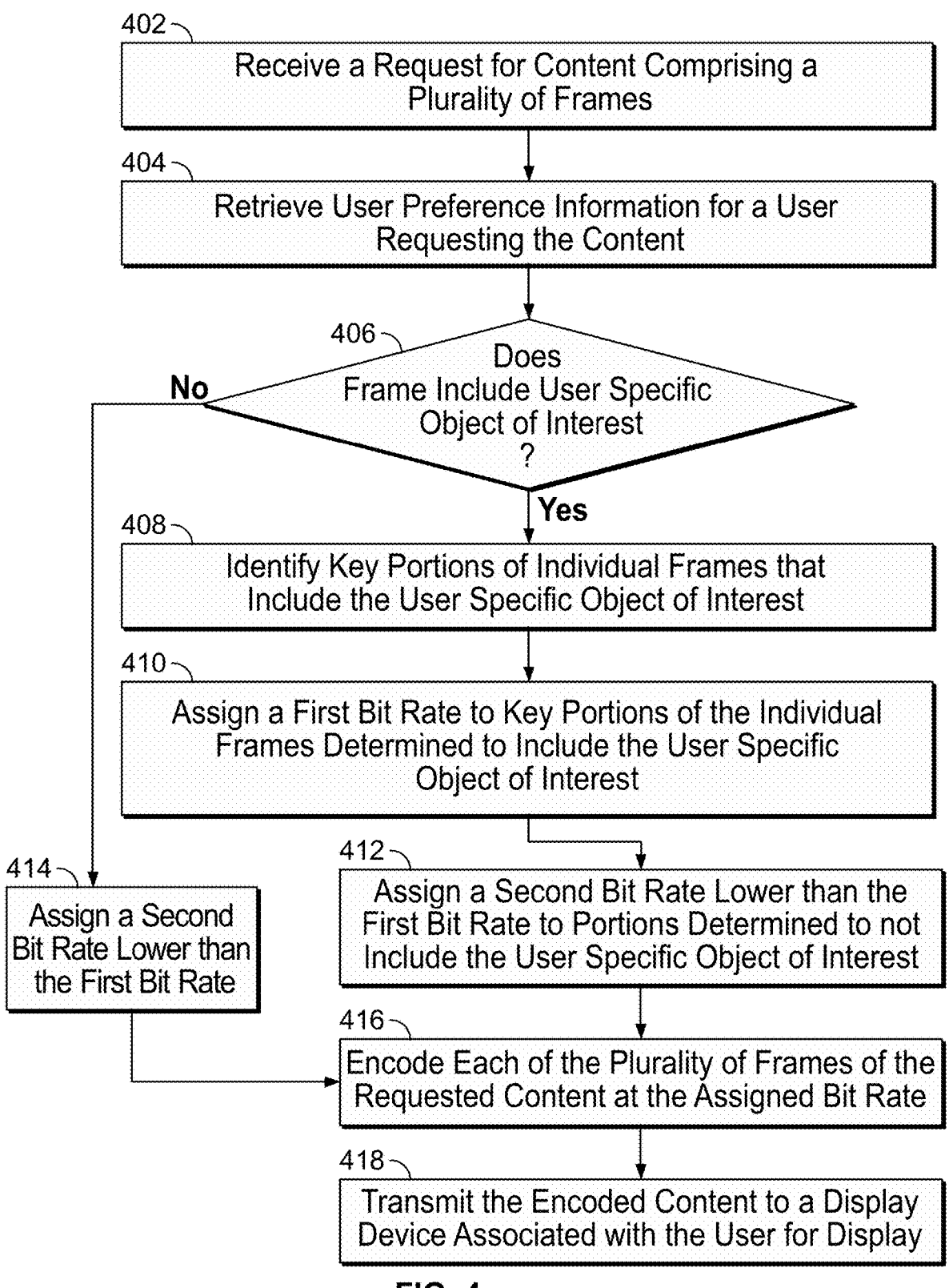

402 — Receive a Request for Content Comprising a Plurality of Frames

404 — Retrieve User Preference Information for a User Requesting the Content

406 — Does Frame Include User Specific Object of Interest ?

No

Yes

408 — Identify Key Portions of Individual Frames that Include the User Specific Object of Interest 410 — Assign a First Bit Rate to Key Portions of the Individual Frames Determined to Include the User Specific Object of Interest 414 — Assign a Second Bit Rate Lower than the First Bit Rate 412 — Assign a Second Bit Rate Lower than the First Bit Rate to Portions Determined to not Include the User Specific Object of Interest 416 — Encode Each of the Plurality of Frames of the Requested Content at the Assigned Bit Rate 418 — Transmit the Encoded Content to a Display Device Associated with the User for Display

League

| User | Sport | Count | Preference Score |
|------|-------|-------|------------------|
| A | Cricket | 5 | High |
| B | Cricket | 1 | Low |
| B | Football | 4 | High |
| A | Basketball | 3 | Medium |
| A | Football | 2 | Low |

804

Cricket Team

| User | Team | Count | Preference Score |
|------|------|-------|------------------|
| A | India | 10 | High |
| B | Bangladesh | 1 | Low |
| B | India | 7 | High |
| A | England | 3 | Medium |
| A | Bangladesh | 2 | Low |

806

Player

| User | Player | Count | Preference Score |
|------|--------|-------|------------------|
| A | V. Kohli | 8 | High |
| B | S. Hasan | 1 | Low |
| B | M.S. Dhoni | 7 | High |
| A | M.S. Dhoni | 9 | Medium |
| A | M. Mortaza | 2 | Low |

FIG. 8

SYSTEMS AND METHODS FOR MULTIPLE BIT RATE CONTENT ENCODING

CROSS-REFERENCE TO RELATED APPLICATIONS

This application is a continuation of U.S. patent application Ser. No. 17/176,503, filed Feb. 16, 2021, which is a continuation of U.S. patent application Ser. No. 16/438,784, filed Jun. 12, 2019, now U.S. Pat. No. 10,951,902, which are hereby incorporated by reference herein their entireties.

BACKGROUND

This disclosure is generally directed to encoding video content. In particular, methods and systems are provided for encoding video content using variable bit rates based on available bandwidth and user preferences.

SUMMARY

With the increasing popularity of playing streaming audio and video over networks such as the Internet, there is a need for optimizing the data transferred from a server to a client device such that the client's experience is maximized even if network conditions during playback are inconsistent. For example, users often want to watch a video over the Internet having only a limited bandwidth for obtaining that video stream. In such instances, users might want to obtain the video stream over a mobile telephone connection or a home wireless connection. In some scenarios, users compensate for the lack of available bandwidth by downloading content to local storage for viewing at a later time. This method is rife with several disadvantages. First, the user is unable to have a real "run-time" experience—that is, the user is unable to view a program when he decides to watch it. Instead, he has to experience significant delays for the content to be downloaded prior to viewing the program. Another disadvantage is in the availability of storage—either the provider or the user has to account for storage resources to ensure that the downloaded content can be stored, even if for a short period of time, resulting in unnecessary utilization of expensive storage resources.

A video stream (typically containing an image portion and an audio portion) can require considerable bandwidth, especially at high resolution (e.g., HD videos). Optimizing the user's experience involves choosing a quality level for encoding the audio and video portions of the video playback such that the video can be transferred and reconstructed uninterrupted while preserving the quality of the video content. A wide range of encoding methods have been developed to provide content to users over variable available bandwidth. In one such example method, an encoder at a server encodes the video content at multiple bit rates and stores copies of the video content encoded at the different bit rates in their respective buffers. The client device (e.g., mobile devices, tablets, computers, smart television systems, and the like) requests chunks of the encoded video content from one or more buffers based on the available bandwidth. However, such methods require a lot of wasted processing power in transcoding the video content at multiple bit rates and additional storage space at the server for the different buffers.

An alternative approach to streaming video content in a variable available bandwidth environment relies on a constant bit rate approach to encoding—i.e., encoding the video content at the server based on a minimum available bit rate per frame value. Each frame or group of frames of the video content is encoded at a constant bit rate based on the available bandwidth. Accordingly, when the network conditions deteriorate (i.e., the available bandwidth drops), the server transcoder encodes the frame of the video content at a lower bit rate, thereby generating a lower quality frame for display at the client device. However, such methods result in a subpar viewing experience for the user because of the reduced quality of the generated display at the client device. For example, when watching a cricket match, the user may miss an important play made by their favorite player due to deterioration in the network connection (i.e., reduction in available bandwidth).

Additionally, methods implementing the above approach encode an entire frame at the same bit rate—thereby allocating too many bits for encoding segments of a frame that the user might not be interested in, and allocating too few bits to segments of the frame in which the user is interested. Consequently, the constant bit rate approach to encoding the streams results in video quality for Internet streaming that is undesirable and inconsistent.

Accordingly, to overcome these problems, systems and methods are provided herein for a multiple bit rate video encoder that accounts for the available bandwidth and the user preferences when encoding video content to be transmitted for display at client devices. Systems and methods described herein account for user preferences when encoding video content at lower bit rates due to deterioration of network conditions.

A server, upon receiving a request for a video stream, retrieves user preferences for the user sending the request for the video stream. At each frame of the video stream, the server, when encoding based on the available bandwidth, analyzes the frame to identify objects of interest to the user in each respective frame. When the available bandwidth is sufficiently high, a frame of the video stream in encoded in high quality in its entirety. However, when the available bandwidth drops, systems and methods are provided herein for allocating a minimum number of bits to segments of the frame that do not include objects of interest to the user, while allocating the remaining extra available bits to segments of the frame which include objects of interest to the user. The resulting encoding frame is decoded by the client device and generated for display such that portions of the frame having objects of interest to the user are generated in high quality despite a deterioration in the network connection.

In one implementation, the objects of interest to the user are categorized in one or more groups, such as an actor, an athlete, a place, and the like. The server analyzes each of the plurality of frames of the video stream to identify one or more objects of interest that match the one or more groups. To identify one or more objects of interest, the server may, in some embodiments, divide the respective frame into a plurality of portions, retrieve metadata for each of the plurality of portions, and compare the retrieved metadata to retrieved user preference information to identify a key portion of the plurality of portions having metadata that match the retrieved user preference information.

In another implementation, the server may generate a color map to identify portions of each frame of the video stream to identify one or more objects of interest to the user. The server then transcodes the key portions of each respective frame (i.e., portions having one or more objects of interest to the user) at a first bit rate and transcodes the remaining portions of each respective frame at a second bit rate lower than the first bit rate.

Additionally, systems and methods are provided herein for allocating bits based on identification of objects of interest to the user in the respective frames of the video stream. The server allocates a minimum number of bits to portions of each respective frame that do not include objects of interest to the user, while allocating a maximum number of bits to portions of each respective frame of the video stream that include objects of interest to the user. In some embodiments, the systems and methods provided herein may give additional preference in bit allocation to portions of the respective frames having more than one object of interest to the user.

In this way, the server is able to transcode different portions of a frame at different bit rates such that the user is able to view portions of the desired video stream in high quality even when network conditions deteriorate thereby resulting in reduced available bandwidth. Additionally, this improvement is particularly relevant when content providers want the consumers to focus on specific portions of each frame (e.g., advertisers who want consumers to focus on their product placement) in the event of a change in the network conditions.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 4 is a flowchart of an illustrative process for multiple bit rate content encoding, in accordance with some embodiments of the disclosure;

FIG. 8 shows an example of a database storing content consumption history for a plurality of users, in accordance with some embodiments of the disclosure.

DETAILED DESCRIPTION

Methods and systems in accordance with the present disclosure are described herein for encoding each of a plurality of frames of a video stream at multiple bit rates based on user preferences and available bandwidth. For example, a user who is an India Cricket team fan requests a video stream of a cricket match between India and Bangladesh. The server encoder encodes each frame of the video stream to ensure that portions of the frame having objects of interest to the user are allocated a greater number of bits than the other portions of the frame. For example, the system encodes portions of the frame in which an Indian player is present at a higher bit rate than portions of the frame in which a Bangladeshi player is featured.

Figure 1:
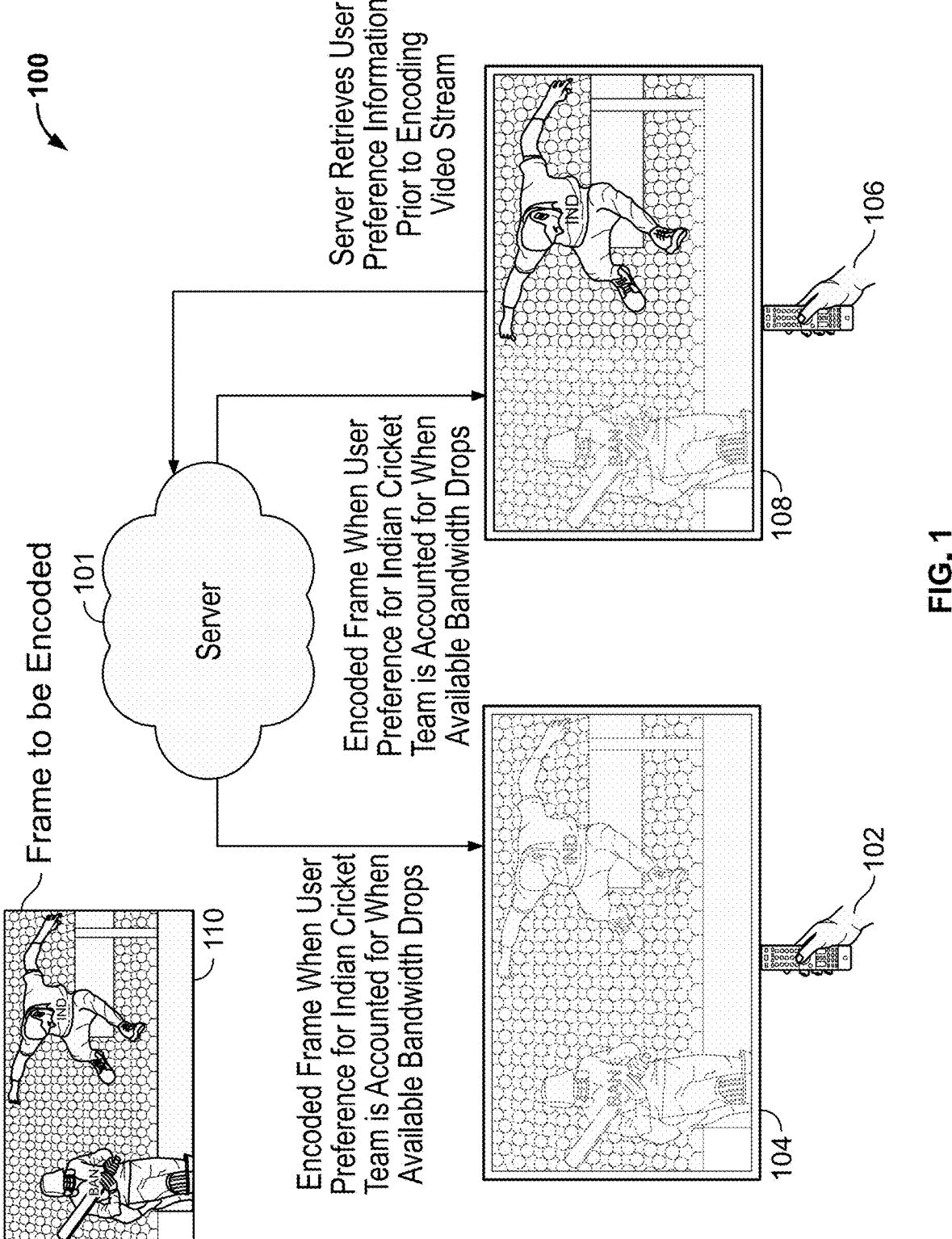
FIG. 1 shows an illustrative depiction of a system for multiple bit rate content encoding, in accordance with some embodiments of the disclosure.

FIG. 1 shows an illustrative depiction of a system 100 for multiple bit rate content encoding, in accordance with some embodiments of the present disclosure. System 100 includes server 101, users 102 and 106, and their respective first and second user equipment devices 104 and 108. Although FIG. 1 depicts first and second user equipment devices 104 and 108 as televisions, it will be understood that any suitable device for displaying video content may be used, such as user television equipment 302, user computer equipment 304, and/or wireless user communications device 306 discussed below in relation to FIG. 3. First and second user equipment devices 104 and 108 may have control circuitry (e.g., control circuitry 204 discussed later in more detail with reference to FIG. 2) configured to request a video content stream from server 101 for display (e.g., on a display such as display 212 discussed later in more detail with reference to FIG. 2).

As shown in FIG. 1, first and second user equipment devices 104 and 108 each request a video stream of a cricket match between India and Bangladesh. It will be understood that, consistent with the present disclosure, any content may be requested for streaming from the server. As referred to herein, the term "content" should be understood to mean an electronically consumable media asset, such as television programming, as well as pay-per-view programs, on-demand programs (such as video-on-demand (VOD) systems), Internet content (e.g., streaming content, downloadable content, Webcasts, etc.), video clips, audio clips, content information, pictures, rotating images, documents, playlists, websites, articles, books, electronic books, advertisements, blogs, chat sessions, social media applications, video games, and/or any other media or multimedia and/or combination of the same. As used herein, the term "multimedia" should be understood to mean content that uses at least two different content forms described above, for example, text, audio, video, images, or interactivity content forms. Content may be recorded, played, displayed, or accessed by the user equipment devices.

Server 101, in response to receiving the request for the video stream, may determine the network conditions for the wireless communication channel between the server and user equipment device 108 in accordance with some embodiments. For example, server 101 may transmit a test packet to user equipment device 108 to determine the available bandwidth and calculate the total number of available bits for encoding the video stream based on the calculated bandwidth information.

Server 101, upon receiving the request for the video stream, retrieves user preferences associated with the users 102 and 106. Moreover, FIG. 1 depicts second user equipment device 108 sending user preference information to server 101 for illustrating the operation of the present disclosure. It will be understood that, consistent with the present disclosure, the user preferences may be stored on server 101. In some embodiments, server 101 may retrieve user preference information about user 106 from a database storing data at a location away from second user equipment device 108. Moreover, control circuitry 204 of second user equipment device 108 may access user preference information (e.g., information about favorite teams of user 106) from one or more of a variety of sources and transmit the user preference information to server 101 when requesting a video stream. Additional details about the collection and retrieval of user preference information is discussed below in the context of FIGS. 7 and 8.

In the example embodiment depicted in FIG. 1, user preference information is available only for user 106, which indicates that user 106 supports the Indian Cricket team. Upon retrieving the user preferences for user 106, server 101 analyzes each frame of the video stream (i.e., each frame of the cricket match between India and Bangladesh) to identify one or more frames that contain objects of interest to the user (e.g., frames that feature an Indian Cricket team player). Server 101 may use one or more well-known methods of recognizing objects of interest in frames. For example, in one embodiment, server 101 may generate a color map to identify one or more frames having the color blue on the color map (i.e., color of the jerseys of the Indian Cricket Team). Additional details about identification of a portion of the frame having the one or more objects of interest are discussed in more detail below in the context of FIG. 9.

Once server 101 identifies the one or more frames of the video stream having objects of interest in them (i.e., players on the Indian Cricket team), server 101 partitions the respective frame into one or more portions and/or slices based on the retrieved user preferences. Once slices are partitioned, server 101, via an encoder (such as encoder 502 explained below in greater detail in connection with FIG. 5), begins the encoding process for the frames comprising the video stream. Specifically, server 101 encodes portions/slices of each frame that do not include an object of interest (i.e., at least one player on the Indian Cricket team) with a minimum average bit rate and allocates the remaining maximum bit rate per frame for portions/slices that include one or more objects of interest (i.e., at least one player on the Indian Cricket team) in each respective frame.

In this manner, the encoder at server 101 can encode an input video stream at a quality optimized for the user viewing the video stream and the available bandwidth.

Figure 2:
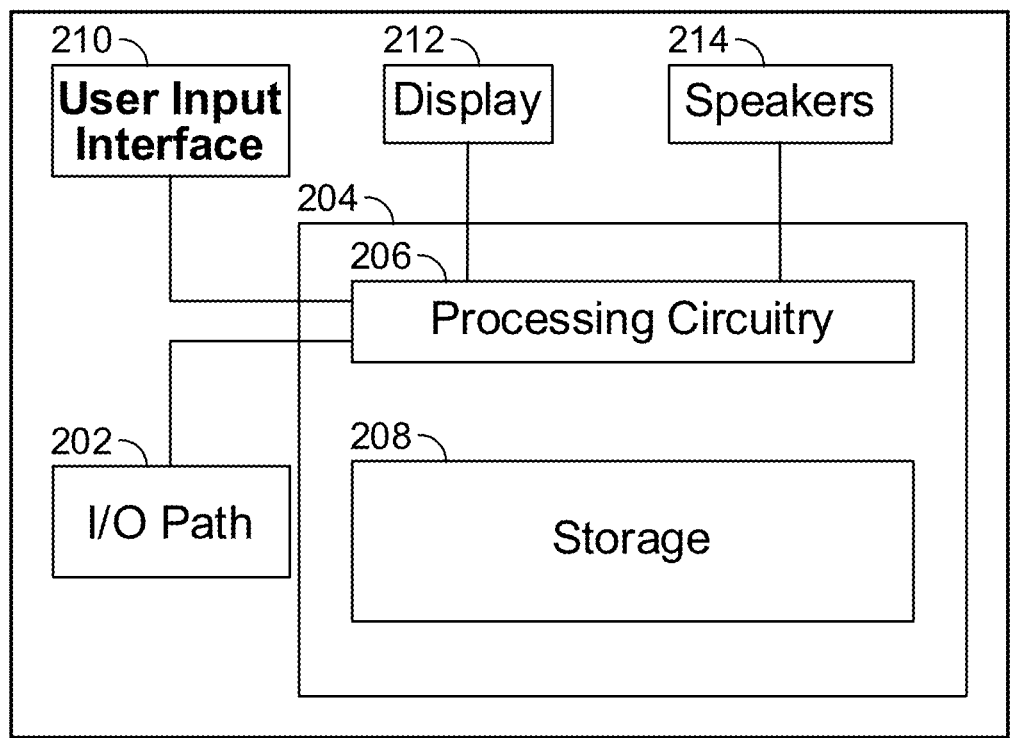
FIG. 2 is a block diagram of an illustrative media system, in accordance with some embodiments of the disclosure.

FIG. 2 depicts a generalized embodiment of an illustrative device (e.g., user equipment devices 104 and 108) that displays a video stream. User equipment device 200 may be any of a plurality of user devices such as a smartphone, a tablet, personal computer, set-top box, etc. (discussed further below with respect to FIG. 3). User equipment device 200 may receive the video stream and data via input/output (hereinafter "I/O") path 202. I/O path 202 may provide the video stream (e.g., on-demand programming, Internet content, content available over LAN or WAN, and the like) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below in relation to FIG. 3). I/O functions may be provided by one or more of these communications paths but are shown as a single path in FIG. 2 to avoid overcomplicating the drawing.

Control circuitry 204 may be based on any suitable processing circuitry such as processing circuitry 206. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multicore processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 204 executes instructions for an application stored in memory (e.g., memory 208). Specifically, control circuitry 204 may be instructed by a media application to perform the functions discussed above and below. For example, the media application may provide instructions to control circuitry 204 to request a video stream from server 101. Moreover, the media application may also collect user preference information and send to server 101 prior to the encoding process. In some implementations, any action performed by control circuitry 204 may be based on instructions received from the media application.

Control circuitry 204 may include tuning circuitry, such as one or more analog tuners, one or more MP3 decoders or other digital decoding circuitry, or any other suitable tuning or audio circuits or combinations of such circuits. Encoding circuitry (e.g., for converting analog or digital signals to signals for storage in storage 208) may also be provided. Control circuitry 204 may also include scaler circuitry for upconverting and downconverting content into the preferred output format of user equipment device 200, and converter circuitry for converting between digital and analog signals. The tuning and encoding circuitry may be used by user equipment device 200 to receive, play, and buffer content. The circuitry described herein, including for example, the tuning, audio generating, encoding, decoding, encrypting, decrypting, scaler, and analog/digital circuitry, may be implemented using software running on one or more general purpose or specialized processors. If storage 208 is provided as a separate device from user equipment device 200, the tuning and encoding circuitry may be associated with storage 208.

Storage 208 may be any device for storing electronic data, such as random-access memory, solid state devices, quantum storage devices, hard disk drives, non-volatile memory or any other suitable fixed or removable storage devices, and/or any combination of the same. Control circuitry 204 may allocate portions of storage 208 for various purposes such as caching application instructions, recording media assets, storing portions of a media asset, buffering segments of media, etc. As described herein, storage 208 may be used to store one or more LUTs storing a number of MAC addresses associated with a plurality of user equipment devices and their corresponding profile information.

A user may send instructions to control circuitry 204 using user input interface 210. User input interface 210 may be any suitable user input interface, such as a remote control, mouse, trackball, keypad, keyboard, touch screen, touchpad, stylus input, joystick, voice recognition interface, or other user input interfaces. Instructions to control circuitry 204 may be transmitted through I/O path 202, that could consist of a video tracking and detection mechanism, Internet of Things (IOT) and home automation triggers, emergency alert systems, and software or hardware communication pipelines and/or notification centers.

Display 212 may be provided as a stand-alone device or integrated with other elements of each one of user equipment device 200. For example, display 212 may be a touchscreen or touch-sensitive display, a projector, or a casting device. In such circumstances, user input interface 210 may be integrated with or combined with display 212. Display 212 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 212. In some embodiments, the graphics processing circuitry may be external to processing circuitry 206 (e.g., as a graphics processing card that communicates with processing circuitry 206 via I/O path 202) or may be internal to processing circuitry 206 or control circuitry 204 (e.g., on a same silicone die as control circuitry 204 or processing circuitry 206). In some embodiments, the graphics processing circuitry may be used to receive, display, and play content.

Speakers 214 may be provided as integrated with other elements of user equipment device 200 or may be stand-alone units. The audio component of videos and other content displayed on display 212 may be played through speakers 214. In some embodiments, the audio may be distributed to a receiver (not shown), which processes and outputs the audio via speakers 214. The speakers 214 may be part of, but not limited to, a home automation system.

The media application may be implemented using any suitable architecture. For example, it may be a stand-alone application wholly implemented on user equipment device 200. The user interface application and/or any instructions for performing any of the embodiments discussed herein may be encoded on computer-readable media. Computer-readable media includes any media capable of storing data.

Figure 3:
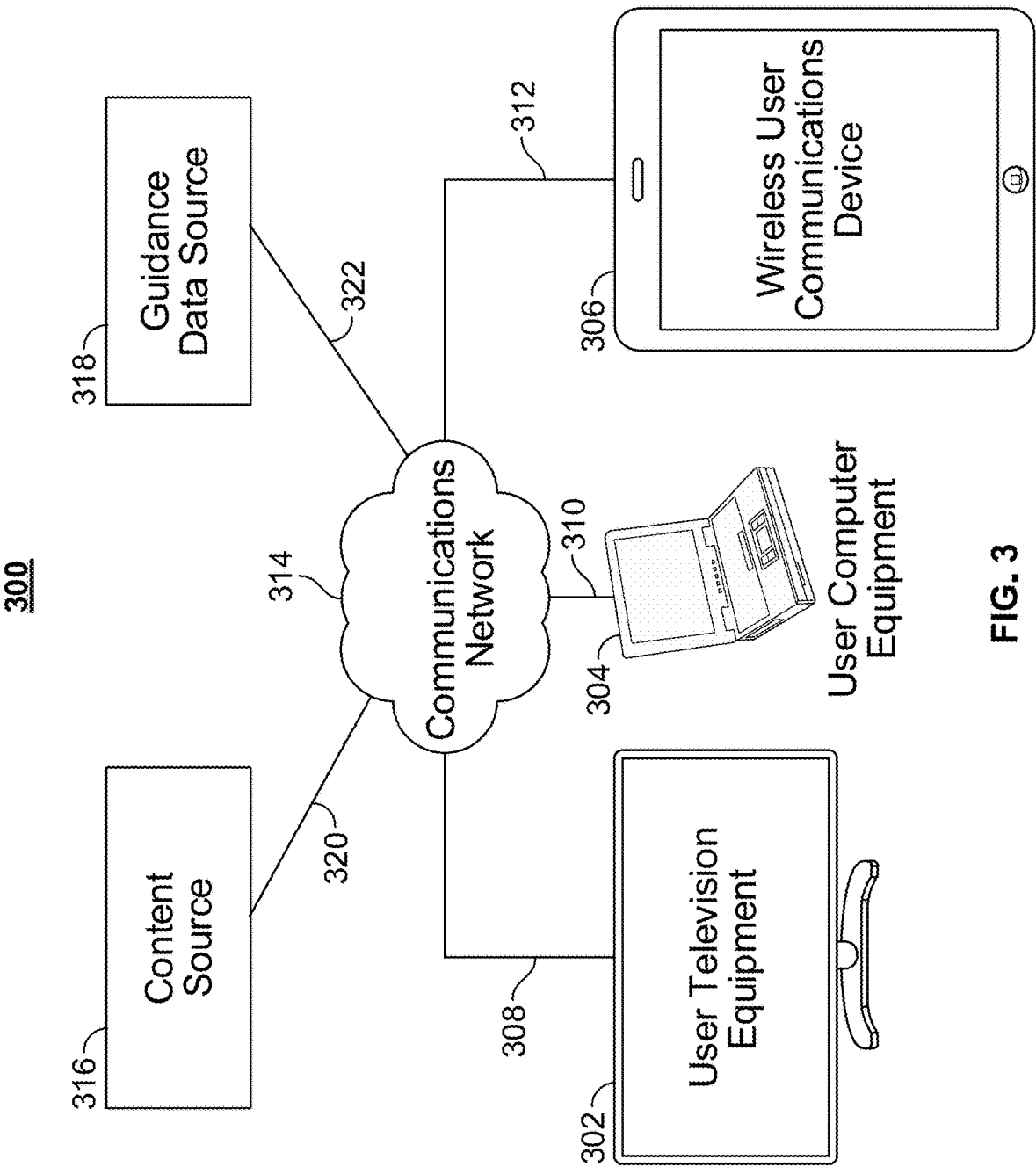
FIG. 3 is a block diagram of an illustrative user equipment device, in accordance with some embodiments of the disclosure.

FIG. 3 depicts an exemplary media system in accordance with some embodiments of the disclosure in which user equipment devices 104 and 108, and user equipment device 200 can be implemented in system 300 of FIG. 3 as user television equipment 302, user computer equipment 304, wireless user communications device 306, or any other type of user equipment suitable for accessing media. For simplicity, these devices may be referred to herein collectively as user equipment. User equipment, on which the media application is implemented, may function as a stand-alone device or may be part of a network of devices. Various network configurations of devices may be implemented and are discussed in more detail below.

User television equipment 302 may include a set-top box, an integrated receiver decoder (IRD) for handling satellite television, a television set, a digital storage device, or other user television equipment. One or more of these devices may be integrated to be a single device, if desired. User computer equipment 304 may include a PC, a laptop, a streaming content aggregator, a PC media center, or other user computer equipment. It may include devices like digital assistance, smart speakers, and/or home automation. Wireless user communications device 306 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 300, there is typically more than one of each type of user equipment but only one of each is shown in FIG. 3 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 314. Namely, user television equipment 302, user computer equipment 304, and wireless user communications device 306 are coupled to communications network 314 via communications paths 308, 310, and 312, respectively. Communications network 314 is used by the user equipment to obtain the video stream. Communications network 314 may be one or more networks including the Internet, a mobile phone network, ad-hoc network, or other types of communications network or combination of communications networks. Paths 308, 310, and 312 may separately or together include one or more communications paths, including any suitable wireless communications path. Paths 308, 310, and 312 are drawn as solid lines to indicate they are wireless paths. Communications with the user equipment may be provided by one or more of these communications paths but are shown as a single path in FIG. 3 to avoid overcomplicating the drawing. The user equipment devices may communicate with each other directly through an indirect path via communications network 314.

System 300 includes content source 316 and guidance data source 318 coupled to communications network 314 via communications paths 320 and 322, respectively. Paths 320 and 322 may include any of the communications paths described above in connection with paths 308, 310, and 312. Communications with the content source 316 and guidance data source 318 may be exchanged over one or more communications paths but are shown as a single path in FIG. 3 to avoid overcomplicating the drawing. In addition, there may be more than one of each of content source 316 and guidance data source 318, but only one of each is shown in FIG. 3 to avoid overcomplicating the drawing. In some embodiments, content source 316 and guidance data source 318 are integrated as one source device. Although communications between sources 316 and 318 with user equipment 302, 304, and 306 are shown as through communications network 314, in some embodiments, sources 316 and 318 may communicate directly with user equipment devices 302, 304, and 306 via communications paths (not shown) such as those described above in connection with paths 308, 310, and 312.

Content source 316 may include one or more types of media distribution equipment such as a media server, cable system headend, satellite distribution facility, intermediate distribution facilities and/or servers, Internet providers, on-demand media servers, and other media providers. Content source 316 may be the originator of media content or may not be the originator of media content. Content source 316 may also include a remote media server used to store different types of media content (including a media asset selected by a user), in a location remote from any of the user equipment. Systems and methods for providing remotely stored media to user equipment are discussed in greater detail in connection with Ellis et al., U.S. patent application Ser. No. 09/332,244, filed Jun. 11, 1999, which is hereby incorporated by reference herein in its entirety.

Guidance data source 318 may provide media guidance data, such as the content information discussed above in relation to FIG. 1 or any other data related to a media asset or profile of a user. Guidance data may be provided to the user equipment using any suitable approach such as via a data feed or by querying a database of guidance data source 318. For example, control circuitry 204 may transmit a query to a database of guidance data source 318 comprising a command to retrieve metadata and an identifier uniquely representing a media asset. In response to transmitting the query, control circuitry 204 may receive a response from the database comprising metadata for the media asset uniquely represented by the identifier.

System 300 is intended to illustrate a number of approaches, or network configurations, by which user equipment devices and sources of media content and guidance data may communicate with each other for the purpose of accessing media and data related to the media. The configuration of the devices and paths in system 300 may change without departing from the scope of the present disclosure.

FIG. 4 is a flowchart of an illustrative process 400 for multiple bit rate content encoding, in accordance with some embodiments of the disclosure. Process 400 begins at 402, where the server receives a request for a video stream comprising a plurality of frames from a user equipment device. For example, server 101 receives requests for a stream of the cricket match between India and Bangladesh from user equipment devices 104 and 108.

At 404, the server retrieves user preference information for the users requesting the content. For example, as discussed above in the context of FIG. 1, server 101 retrieves user preference information about user 106. In some embodiments, control circuitry 204 of user equipment device 108 collects user preference information about user 106 using the viewing history of user 106. For instance, user equipment device 108 may determine that user 106 is an Indian Cricket team supporter by reviewing the viewing history of user 106 and determining that user 106 always watches the cricket match when the Indian Cricket team is playing. Alternatively, or in addition, the user equipment device may use a camera to identify the user requesting the content and user preference information based on a captured image. For example, user equipment device 108 may capture an image of the room when the stream of the cricket match between India and Bangladesh is requested and determine whether the viewers in the room are wearing jerseys supporting one of the teams. For instance, user equipment device 108 may generate a color map of the captured image to identify that user 106 is wearing a blue jersey and determine that user 106 is a supporter of the Indian Cricket Team. Although the above description describes the user preference information being collected at the user equipment devices, a person skilled in the art will understand that said information may be collected and stored at the server in various embodiments. For example, user preference information for users requesting content for streaming may be stored on a remote database and the server may retrieve said information upon receiving a request for content from the user equipment devices.

Once the server retrieves the user preference information for the user requesting the content, the process proceeds to 406. At 406, the server analyzes each frame of the requested content to determine whether the frame includes one or more objects of interest. As will be explained in more detail in the context of FIG. 5, the server includes a User Preference Identification (UPI) module which receives the retrieved user preference information and analyzes each frame of the requested content to identify frames that contain one or more objects of interest to the user. For example, as illustrated in FIG. 1, server 101 analyzes each frame of the cricket match between India and Bangladesh to identify frames that contain an object of interest to user 106, such as an Indian Cricket team player.

If, at 406, it is determined that a frame contains an object of interest to the user, the process proceeds to 408. If, on the other hand, it is determined that a frame does not contain an object of interest to the user, the process proceeds to 414, which is discussed below in greater detail. At 408, the server identifies portions in the frame that contain the objects of interest to the user. As will be explained in more detail with reference to FIG. 6, the server partitions the frame into multiple portions and identifies one or more key portions that include the object of interest. For example, server 101 identifies portions of each frame of the cricket match between India and Bangladesh that include an Indian Cricket team player. Server 101 may use any one of various well-known algorithms to identify the objects of interest. For example, server 101 may generate a color map for each of the frames and compare to the user preference information. Server 101 identifies portions of the frame that feature the color blue (i.e., color of the team jerseys of the Indian Cricket team). Additional detail about partitioning a frame into multiple portions is provided in the context of FIG. 6 below.

Upon identification of the key portions of each respective frame, the server allocates available bit rates to different portions of each frame of the content stream. Specifically, at 410, the server allocates a first bit rate to key portions of the frame that include one or more objects of interest to the user. For example, server 101 allocates a first bit rate (i.e., bit rate at which the portions are to be encoded) to portions of the frame that include one or more players from the Indian Cricket team. The remaining portions of each of the frames that do not include one or more objects of interest are allocated a second bit rate (i.e., bit rate at which the portions are to be encoded) that is lower than the first bit rate at 412. Similarly, frames determined to not include an object of interest at 406 are also allocated the second bit rate (at 414). In some implementations, the first bit rate (i.e., bit rate at which the portions that include objects of interest to the user are to be encoded) is set to be the maximum bit rate per frame and the second bit rate (i.e., bit rate at which the portions that do not include objects of interest to the user are to be encoded) is set to be the minimum average bit rate.

At 416, an encoder at the server encodes the portions of each of the frames at the respective allocated bit rates. For example, encoder 502 of server 101 encodes each of the portions at the respective allocated first and second bit rates. That is, portions of the frame that include an Indian Cricket team player are encoded at the first bit rate and portions of the frame that do not include Indian Cricket team players are encoded at the second bit rate. In some implementations, the encoder includes multiple processors operating in parallel to encode the different portions of each frame at their respective allocated bit rates.

At 418, the server then transmits the encoded video to the user equipment device over the wireless connection. In some embodiments, the encoder at the server generates a plurality of data packets, each of which includes a payload of bits encoded at their respective allocated bit rates. The user equipment device decodes the received data packets and generates the received stream for display. Accordingly, the available number of bits are allocated to improve the user's viewing experience by ensuring that portions of each frame that include objects of interest are encoded using the maximum bit rate per frame. The user therefore does not miss out on important events in the requested content stream when network conditions deteriorate.

Figure 5:
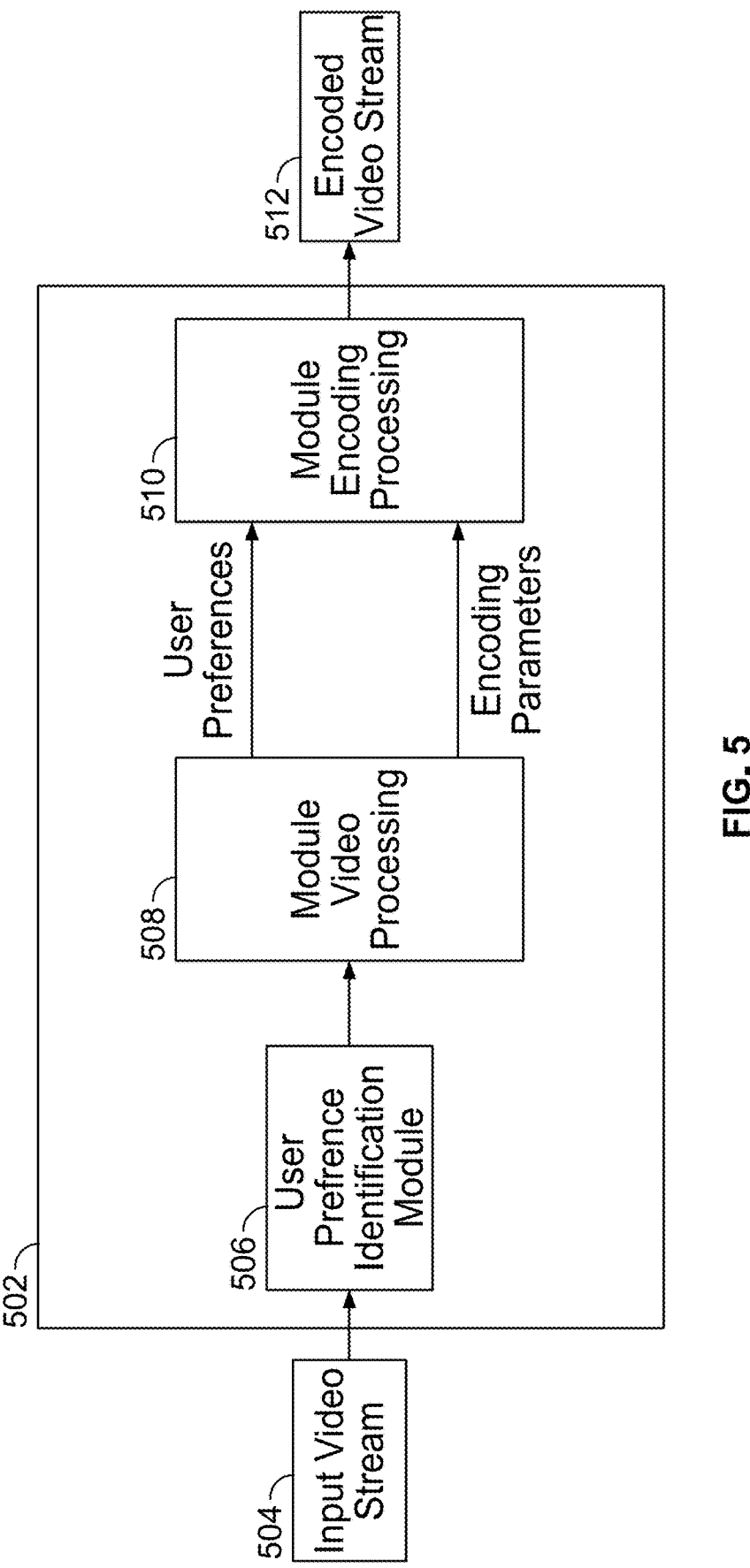
FIG. 5 is an example encoder, in accordance with some embodiments of the disclosure.

FIG. 5 illustrates an example of an encoder 502, according to one embodiment of the systems and methods disclosed herein. The encoder 502 receives an input video stream 504 and outputs an encoded video stream 512 that can be decoded at a decoder to recover, at least approximately, an instance of the input video stream 504. The encoder 502 comprises a user preference identification (UPI) module 506, a video processing module 508, and a video encoding module 510. The encoder 502 may be implemented in hardware, software, or any suitable combination. The encoder 502 may include other components such as a parameter input module, memory for storing parameters, etc. The encoder 502 may perform other video processing functions not specifically described herein.

The UPI module 506 compares each frame of the received input video stream 504 to the user preference information. The input video stream 504 may take any suitable form and may originate from any of a variety of suitable sources such as memory, or even from a live feed.

The video processing module 508 analyzes the input video stream 504 and splits each frame of the video stream 504 into a plurality of portions along with its respective video encoding parameters for each of the plurality of portions. In one embodiment, video processing module 508 divides the respective frames of the video stream into a plurality of portions based on object boundaries. In some implementations, the object boundaries are determined by generating a color map of the respective frame. The video processing module 508 further determines an object type for each of the plurality of portions. Finally, the video processing module 508 determines video encoding parameters used by a video encoding module 510 to encode each portion of the respective frame at the allocated bit rates. The bit rates may be predefined for each portion or may be calculated and/or adapted during the video stream processing. The video encoding module 510 receives a plurality of portions and their respective allocated bit rates from the video processing module 508 to encode each of the plurality of portions according to its respective encoding bit rates and output an encoded video stream 512.

Figure 6:
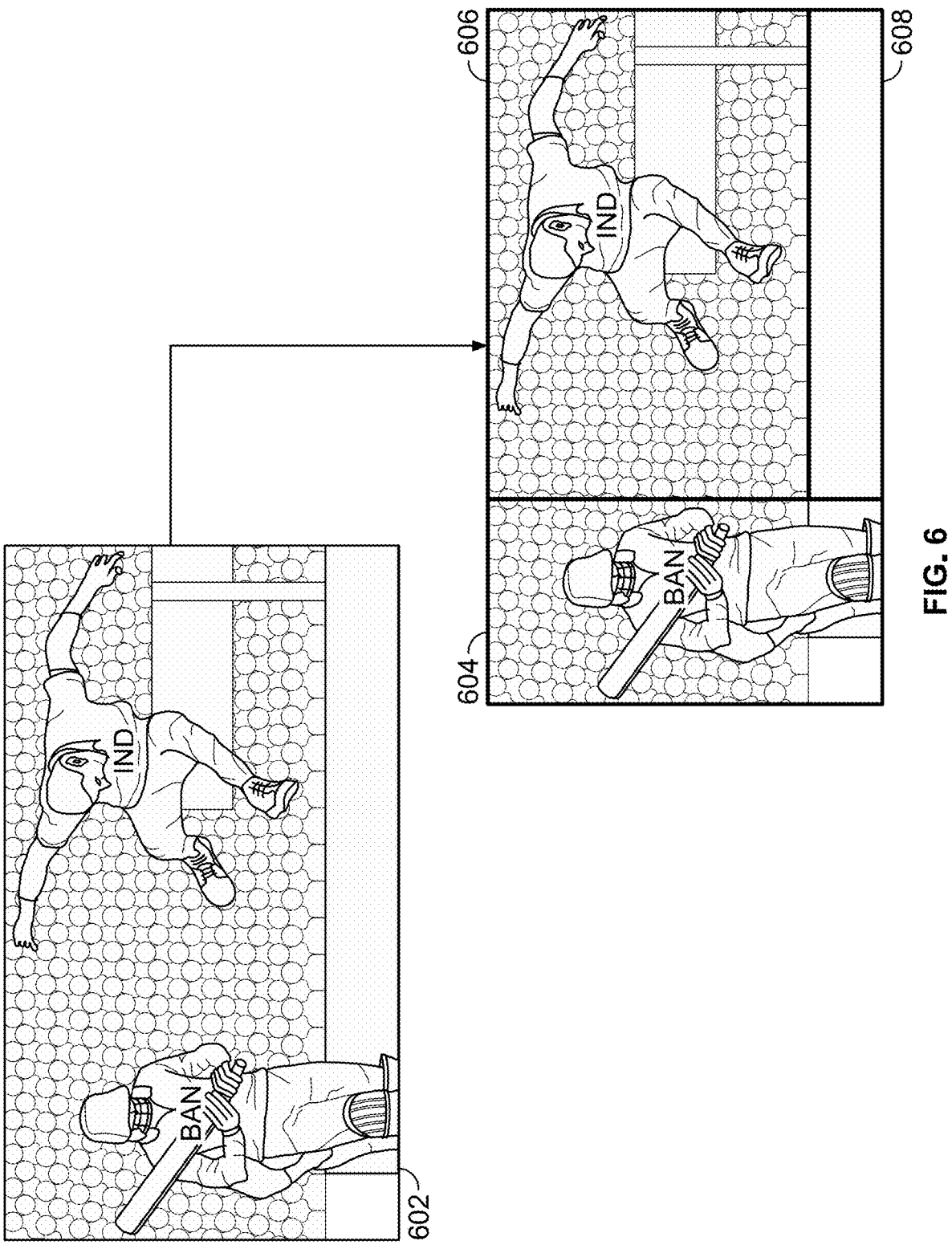
FIG. 6 illustrates an example division of a frame into a plurality of portions, in accordance with some embodiments of the disclosure.

FIG. 6 illustrates an example operation by the video processing module to divide each of the frames having an object of interest to the viewer into multiple portions. As illustrated in FIG. 6, the server (via a video processing module in an encoder such as the one illustrated in FIG. 5) partitions a frame 602 based on user preference information. For example, video processing module 508 partitions the frame 602 into portions 604, 606, and 608 by generating a color map. As shown in FIG. 6, portion 604 has the color green (color of Bangladesh team jerseys), portion 606 has the color blue (color of Indian team jerseys), and portion 608 has the color red (color of the advertisement board). Accordingly, the video encoding module 510 encodes the portion 606 at a higher bit rate than portions 604 and 608 when network conditions deteriorate in accordance with process 400.

Figure 7:
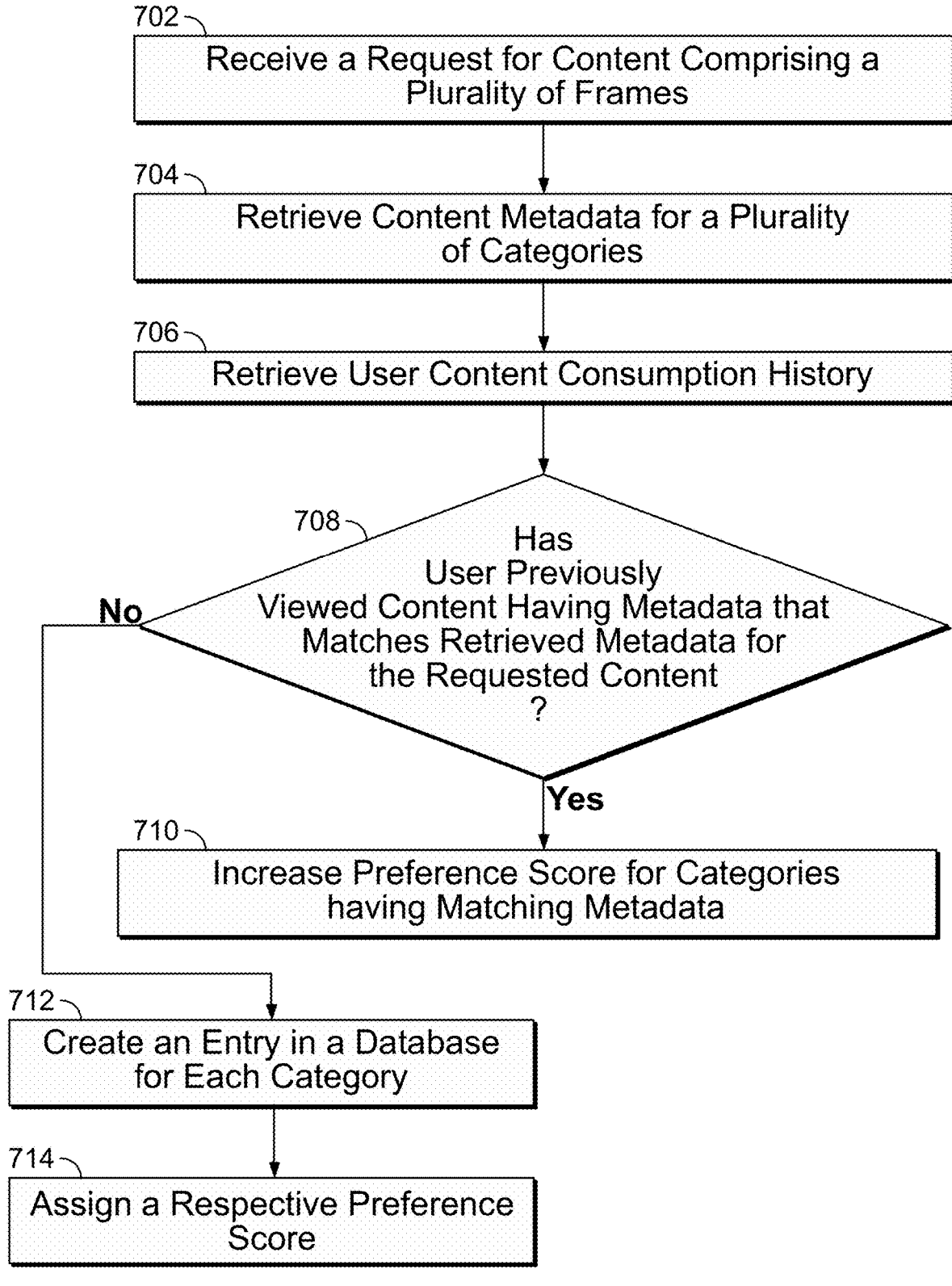
FIG. 7 is a flowchart of an illustrative process for determining user preference information for a user based on content consumption history, in accordance with some embodiments of the disclosure.

FIG. 7 is a flowchart of an illustrative process for determining user preference information for a user based on content consumption history, in accordance with some embodiments of the disclosure. At 702, the server receives a request for a content stream (e.g., the cricket match between India and Bangladesh as illustrated in FIG. 1). At 704, the server retrieves content metadata for a plurality of categories related to the requested content stream. For example, the server may retrieve metadata indicating the names of the teams playing in the cricket match, the names of the players participating in the cricket match, the name and geographic location of the stadium where the match is being played, the broadcast channel on which the content is being streamed, and the like. A person skilled in the art will understand that metadata for any number of categories related to the requested content stream may be retrieved by the server and the above-listed categories are for example purposes only.

At 706, the server retrieves the content consumption history for the user requesting the content stream. For example, server 101 may retrieve user preference information from user equipment device 108. The user preference information retrieved from user equipment device 108 may include a preference score assigned to a plurality of categories, such as the teams playing in the cricket match, the individual players on the respective teams, and the like. For instance, the retrieved user preference information may indicate that user 106 frequently watches cricket matches when India is participating but rarely watches when Bangladesh is playing. Additional details about user preference information and assignment of respective preferences scores for the different categories are discussed below in greater detail in the context of FIG. 8.

At 708, the server compares the retrieved user preference information, including the preference scores assigned to the plurality of categories, with the retrieved content metadata for the requested content stream. For example, server 101 compares the teams playing in the requested cricket match (i.e., India and Bangladesh) with the user's content consumption history to determine whether the user prefers one of the two teams participating in the requested cricket match.

If it is determined that the user has previously viewed content having metadata that matches retrieved metadata for the requested content stream (YES at 708), the process proceeds to 710, and the preference score for categories having matching metadata is increased. For example, if the server determines that the user has previously watched cricket matches in which India plays, the server increases the preference scores for players on the Indian Cricket team. Accordingly, UPI module 506 identifies frames in which Indian Cricket players are included and video processing module 508 partitions each frame into a plurality of portions where a key portion includes the objects having the highest preference scores attached to them (i.e., Indian Cricket team players). There may be some frames in which more than one object of interest is featured (e.g., when multiple Indian Cricket team players are in the same frame). In such instances, the server may prioritize the allocation of the maximum available bit rate per frame to a portion of the frame that includes an object of interest having the highest preference score associated with it.

If, on the other hand, it is determined that the user has never viewed content having metadata that matches retrieved metadata for the requested content stream (NO at 708), the process proceeds to 712, and the server creates an entry in the database for each category of content metadata. For example, if the server determines that the user has never watched a cricket match between India and Bangladesh, the server creates an entry in the database for the different categories related to the metadata for the cricket match. At 714, the server assigns a default preference score for the different metadata items for use in the future. In such embodiments, the server may allocate a higher number of bits to portions of the frame in which important events in the content happen. For example, the server may allocate a higher number of bits to portions of the frame in which a player is involved in a run-scoring opportunity, while allocating a lower number of bits to portions of the frame in which the audience is featured. Accordingly, the viewing experience for the user is optimized even when user preference information is not available for the user (e.g., user 102).

FIG. 8 shows an example of a database storing content consumption history for a plurality of users, in accordance with some embodiments of the disclosure. As shown in table 802, a database stores information for a plurality of users (users A and B) for a plurality of sports-related content. A person skilled in the art will appreciate that similar databases may store information for content categorized by, for example, different genres. As illustrated in FIG. 8, table 802 stores content consumption history for users A and B for different sports (e.g., cricket, football, and basketball), their respective counts (i.e., the number of times the respective user has requested content related to the corresponding sport within some predetermined period of time), and an associated preference score. It is to be noted that the illustrated preference score scale (scored on a scale of Low-Medium-High) is merely provided as an example, and that any suitable scale may be used (e.g., scored on a scale of 1-10). The preference score is determined based on a frequency with which the corresponding user has requested content related to the particular sport (i.e., based on the count). Accordingly, the server is able to determine, by analyzing table 802, that user A has a strong preference for Cricket while user B has little interest in the sport.

Table 804 similarly illustrates a database that stores information for a plurality of users (users A and B) for a plurality of team specific content for the sport of cricket. A person skilled in the art will appreciate that similar databases may store information for content categorized for other sports. As illustrated in FIG. 8, table 804 stores content consumption history for users A and B for different teams (e.g., India, England, and Bangladesh), their respective counts (i.e., the number of times the respective user has requested content related to the corresponding teams within some predetermined period of time), and an associated preference score. It is to be noted that the illustrated preference score scale (scored on a scale of Low-Medium-High) is merely provided as an example, and that any suitable scale may be used (e.g., scored on a scale of 1-10). The preference score is determined based on a frequency with which the corresponding user has requested content related to the particular team (i.e., based on the count). Accordingly, the server is able to determine, by analyzing table 804, that user A has a strong preference for the Indian Cricket team while both users A and B have little interest in the Bangladeshi Cricket team.

Additionally, table 806 illustrates a database that stores information for a plurality of users (users A and B) for specific cricket players. As illustrated in FIG. 8, table 806 stores content consumption history for users A and B for different players (e.g., V. Kohli, S. Hasan, M. S. Dhoni, M. Mortaza), their respective counts (i.e., the number of times the respective user has requested content related to the corresponding players within some predetermined period of time), and an associated preference score. It is to be noted that the illustrated preference score scale (scored on a scale of Low-Medium-High) is merely provided as an example, and that any suitable scale may be used (e.g., scored on a scale of 1-10). The preference score is determined based on a frequency with which the corresponding user has requested content related to the particular player (i.e., based on the count). Accordingly, the server is able to determine, by analyzing table 802, that user A has a strong preference for V. Kohli and M. S. Dhoni while both users A and B have little interest in the players on the Bangladeshi Cricket team (i.e., S. Hasan and M. Mortaza).

Accordingly, the server is able to retrieve preference scores for each of the categories (e.g., sport, team, player, and the like) associated with content previously consumed by users and compare them to retrieved content metadata for the requested content stream. A person skilled in the art will appreciate that similar databases may be generated for other content consumed by the users (e.g., movies, actors, directors, genre, and the like).

Figure 9:
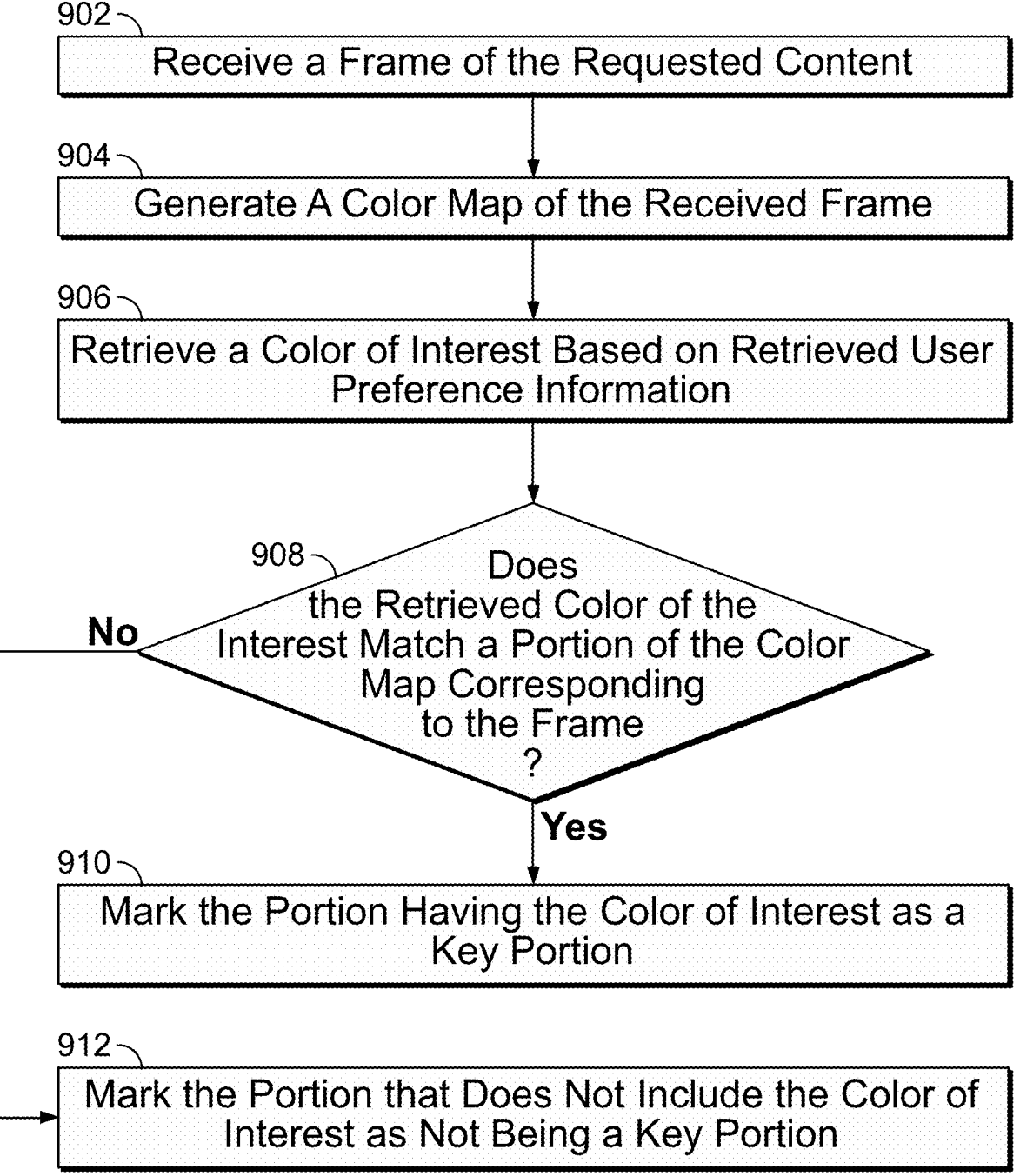
FIG. 9 is a flowchart of an illustrative process for recognizing key portions in a frame that include one or more objects of interest, in accordance with some embodiments of the disclosure.

FIG. 9 is a flowchart of an illustrative process for recognizing key portions in a frame that include one or more objects of interest, in accordance with some embodiments of the disclosure. The UPI module 506 receives individual frames of the input video stream 504 at 902. For example, the UPI module 506 receives individual frame 602 of the cricket match between India and Bangladesh. At 904, the server generates a color map of the received frame using well-known technologies. For example, the server may extract a color value in 24-bit RGB format for each pixel of the received frame.

At 906, the server retrieves a color of interest to the user determined based on the retrieved user preference information. For example, the server may determine the color of interest for user 106 to be blue based on a high preference score associated with players on the Indian Cricket team. At 908, the server analyzes the generated color map to identify a portion of the frame having pixels with the color value matching the color of interest. If it is determined that the received frame has a portion which includes a color of interest to the user (YES at 908), the process proceeds to 910 and the portion including the color of interest is marked as a key portion. For example, as illustrated in FIG. 6, the server may analyze frame 602 and determine that a portion 606 includes pixels having a color value equivalent to blue (e.g., HEX #87ceeb). Thus, portion 606 is marked as key portion to be encoded at a higher bit rate per frame relative to the other portions.

If, on the other hand, it is determined that the received frame does not have a portion which includes a color of interest to the user (NO at 908), the process proceeds to 912 and the portions that do not include the color of interest are allocated to be encoded at a minimum average bit rate per frame. For example, as illustrated in FIG. 6, the server may analyze frame 602 and determine that portions 604 and 608 do not include pixels having a color value equivalent to blue (e.g., HEX #87ceeb). Thus, portions 604 and 608 are marked to be encoded at a minimum average bit rate per frame. Accordingly, the server encoder 502 allocates the available bits to the different portions of each frame of the requested content stream.

As noted above, processes 400 (comprising steps 402-418), 700 (comprising steps 702-714), and 900 (comprising steps 902-912) may be performed in combination with any other subroutines or performed by themselves.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, processes 400, 700, and 900 can be performed on any of the devices shown in FIGS. 1-3. Additionally, any of the steps in processes 400, 700, and 900 can be performed in any order, can be omitted, and/or can be combined with any of the steps from any other process.

While some portions of this disclosure may refer to "convention," any such reference is merely for the purpose of providing context to the invention(s) of the instant disclosure, and does not form any admission as to what constitutes the state of the art.

What is claimed is:

1. A method comprising:

receiving, at a server from a requesting device, a request to display a content item;

receiving, at the server from the requesting device, an image of an environment in which the content item is requested for display;

accessing the content item, the content item comprising a plurality of frames;

analyzing, by the server, a frame of the plurality of frames to identify, based on the image of the environment in which the content item is requested for display, (a) a key portion of the frame and (b) a non-key portion of the frame;

encoding, by the server, the frame by allocating a higher number of bits to the key portion of the frame and a lower number of bits to the non-key portion of the frame; and transmitting, by the server, the encoded frame for display by the requesting device.

2. The method of claim 1, wherein the requesting device comprises a camera, and wherein the method further comprises:

capturing, using the camera of the requesting device, an image of a room in which the content item is requested to be displayed by the requesting device; and receiving, from the requesting device, the image of the room, wherein the image of the room is the image of the environment in which the content item is requested for display.

3. The method of claim 2, further comprising:

analyzing the image of the room to identify a color of clothing worn by a person in the image of the room; and identifying the key portion of the frame by comparing the color of the clothing worn by the person in the image of the room to one or more colors in the frame.

4. The method of claim 2, further comprising:

identifying, based on the image of the room, a sports team associated with clothing worn by a person in the image; and identifying the key portion of the frame based on the identified sports team.

5. The method of claim 1, further comprising:

identifying the key portion of the frame based on the image of the environment in which the content item is requested for display, and based on a user profile associated with the request to display the content item.

6. The method of claim 1, further comprising:

identifying the key portion of the frame, and then identifying the non-key portion as any portion of the frame other than the key portion.

7. The method of claim 1, further comprising:

determining network conditions for a communications network for encoding the frame; and calculating an available number of bits for the frame based on the network conditions.

8. The method of claim 7, wherein allocating the lower number of bits to the non-key portion of the frame comprises allocating a predefined number of bits of the calculated available number of bits, and wherein allocating the higher number of bits to the key portion of the frame comprises allocating a remaining number of bits of the calculated available number of bits.

9. The method of claim 1, wherein the content item is a live video stream.

10. The method of claim 1, further comprising:

generating a color map corresponding to the frame;

comparing the color map to the image of the environment in which the content item is request for display; and identifying the key portion and the non-key portion based on the comparison.

11. A system comprising:

communication circuitry configured to:

receive, from a requesting device, a request to display a content item; and receive an image of an environment in which the content item is requested for display; and control circuitry configured to:

access the content item, the content item comprising a plurality of frames;

analyze a frame of the plurality of frames to identify, based on the image of the environment in which the content item is requested for display, (a) a key portion of the frame and (b) a non-key portion of the frame; and encode the frame by allocating a higher number of bits to the key portion of the frame and a lower number of bits to the non-key portion of the frame, wherein the communication circuitry is further configured to transmit the encoded frame to the requesting device for display by the requesting device.

12. The system of claim 11, wherein the requesting device comprises a camera configured to capture an image of a room in which the content item is requested to be displayed by the requesting device, wherein the image of the room is the image of the environment in which the content item is requested for display, and wherein the communication circuitry is further configured to receive the image of the room.

13. The system of claim 12, wherein the control circuitry is further configured to:

analyze the image of the room to identify a color of clothing worn by a person in the image of the room; and identify the key portion of the frame by comparing the color of the clothing worn by the person in the image of the room to one or more colors of the frame.

14. The system of claim 12, wherein the control circuitry is further configured to:

identify, based on the image of the room, a sports team associated with clothing worn by a person in the image; and identify the key portion of the frame based on the identified sports team.

15. The system of claim 11, wherein the control circuitry is further configured to:

identify the key portion of the frame based on the image of the environment in which the content item is requested for display, and based on a user profile associated with the request to display the content item.

16. The system of claim 11, wherein the control circuitry is further configured to:

identify the key portion of the frame, and then identify the non-key portion as any portion of the frame other than the key portion.

17. The system of claim 11, wherein the control circuitry is further configured to:

determine network conditions for a communications network for encoding the frame; and calculate an available number of bits for the frame based on the network conditions.

18. The system of claim 17, wherein the control circuitry is configured to allocate the lower number of bits to the non-key portion of the frame by allocating a predefined number of bits of the calculated available number of bits, and allocate the higher number of bits to the key portion of the frame by allocating a remaining number of bits of the calculated available number of bits.

19. The system of claim 11, wherein the content item is a live video stream.

20. The system of claim 11, wherein the control circuitry is further configured to:

generate a color map corresponding to the frame;

compare the color map to the image of the environment in which the content item is request for display; and identify the key portion and the non-key portion based on the comparison.

* * * * *